US012517538B2

(12) United States Patent
Qin et al.

(10) Patent No.: US 12,517,538 B2
(45) Date of Patent: Jan. 6, 2026

(54) POWER SUPPLY CIRCUIT AND CHIP

(71) Applicant: CHANGXIN MEMORY TECHNOLOGIES, INC., Hefei (CN)

(72) Inventors: Jianyong Qin, Hefei (CN); Weibing Shang, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 124 days.

(21) Appl. No.: 18/454,841

(22) Filed: Aug. 24, 2023

(65) Prior Publication Data

US 2024/0053785 A1 Feb. 15, 2024

Related U.S. Application Data

(63) Continuation of application No. PCT/CN2022/126370, filed on Oct. 20, 2022.

(30) Foreign Application Priority Data

Aug. 15, 2022 (CN) ........................ 202210977602.7

(51) Int. Cl.
*G05F 1/61* (2006.01)
*G05F 1/618* (2006.01)

(52) U.S. Cl.
CPC .................................... *G05F 1/618* (2013.01)

(58) Field of Classification Search
CPC ..... G05F 3/10; G05F 3/16; G05F 3/18; G05F 3/185; G05F 3/20; G05F 3/26; G05F 3/30;

(Continued)

(56) References Cited

U.S. PATENT DOCUMENTS 6,809,968 B2 10/2004 Marr
6,958,597 B1 * 10/2005 Lin ........................ G05F 3/262 323/907
7,068,024 B1 6/2006 Huang (Continued)

FOREIGN PATENT DOCUMENTS

CN 1808323 A 7/2006
CN 101901018 A 12/2010

(Continued)

OTHER PUBLICATIONS

International Search Report in the international application No. PCT/CN2022/126370, mailed on Jan. 13, 2023. 4 pages.

(Continued)

*Primary Examiner* — Jeffrey A Gblende
(74) *Attorney, Agent, or Firm* — Syncoda LLC; Feng Ma

(57) ABSTRACT

A power supply circuit and a chip to which the power supply circuit is applied are disclosed. The power supply circuit includes a constant current generation circuit and a voltage generation circuit. The constant current generation circuit is configured to generate a first current with a positive temperature coefficient and a second current with a negative temperature coefficient, and generate a constant current according to the first current and the second current. The voltage generation circuit includes a transistor, is coupled to the constant current generation circuit, and configured to generate a temperature-dependent voltage according to the constant current and characteristics of the transistor.

18 Claims, 4 Drawing Sheets

1

(58) Field of Classification Search
CPC .............. G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/463; G05F 1/468; G05F 1/46; G05F 1/461; G05F 1/575; G05F 1/465; G05F 1/618
See application file for complete search history.

(56) References Cited

U.S. PATENT DOCUMENTS

| | | | | |
|---|---|---|---|---|
| 7,417,490 | B2 | 8/2008 | Kim | |
| 7,667,528 | B2 | 2/2010 | Kim | |
| 8,018,197 | B2 | 9/2011 | Nascimento | |
| 8,786,271 | B2 * | 7/2014 | Chang | G05F 3/30 327/538 |
| 10,203,715 | B2 * | 2/2019 | Liou | G05F 3/30 |
| 10,296,026 | B2 | 5/2019 | Caffee | |
| 11,656,646 | B2 | 5/2023 | Yang et al. | |
| 2003/0038672 | A1 * | 2/2003 | Buckley, III | G05F 3/30 327/539 |
| 2004/0207380 | A1 | 10/2004 | Ariki | |
| 2006/0145679 | A1 | 7/2006 | Huang | |
| 2007/0058457 | A1 | 3/2007 | Kim | |
| 2009/0033406 | A1 | 2/2009 | Kim | |
| 2009/0315525 | A1 | 12/2009 | Nascimento | |
| 2010/0141159 | A1 | 6/2010 | Shiu | |
| 2017/0115677 | A1 | 4/2017 | Caffee | |
| 2021/0255656 | A1 | 8/2021 | Wang | |
| 2022/0019254 | A1 | 1/2022 | Yang | |

FOREIGN PATENT DOCUMENTS

| | | | |
|---|---|---|---|
| CN | 101930248 | A | 12/2010 |
| CN | 102279617 | A | 12/2011 |
| CN | 105656481 | A | 6/2016 |
| CN | 106155165 | A | 11/2016 |
| CN | 108037791 | A | 5/2018 |
| CN | 108153360 | A | 6/2018 |
| CN | 108646844 | A | 10/2018 |
| CN | 109917843 | A | 6/2019 |
| CN | 110377095 | A | 10/2019 |
| CN | 210666511 | U | 6/2020 |
| CN | 111552342 | A | 8/2020 |
| CN | 212872583 | U | 4/2021 |
| CN | 112764450 | A | 5/2021 |
| CN | 113110691 | A | 7/2021 |
| CN | 214311491 | U | 9/2021 |
| CN | 113961031 | A | 1/2022 |
| CN | 114740938 | A | 7/2022 |
| KR | 20040084176 | A | 10/2004 |

OTHER PUBLICATIONS

International Search Report in the international application No. PCT/CN2022/126372, mailed on May 11, 2023. 5 pages.
International Search Report in the international application No. PCT/CN2022/126376, mailed on May 11, 2023. 5 pages.
CN first office action in application No. 202210977602.7, mailed on Nov. 28, 2025.

* cited by examiner

POWER SUPPLY CIRCUIT AND CHIP

CROSS-REFERENCE TO RELATED APPLICATIONS

This application is a continuation of International Application No. PCT/CN2022/126370, filed on Oct. 20, 2022, which claims priority to Chinese Patent application No. 202210977602.7, filed on Aug. 15, 2022 and entitled "POWER SUPPLY CIRCUIT AND CHIP". The contents of International Application No. PCT/CN2022/126370 and Chinese Patent application No. 202210977602.7 are hereby incorporated by reference in their entireties.

TECHNICAL FIELD

The disclosure relates to the technical field of electronic circuits, and in particular to a power supply circuit and a chip to which the power supply circuit is applied.

BACKGROUND

In chip design, an output voltage of a power supply circuit is usually set to be a constant voltage. In an occasion where the circuit needs to be controlled according to temperature or characteristics of a transistor, a detection circuit is separately designed to perform detection and outputs a control signal according to the detection result. In this way, circuit structures are usually complicated.

Nowadays, with the increasing demand on reduction of chip volume, simplifying design of circuits in the chip has become an urgent problem to be solved in the field.

It should be noted that information disclosed in the above background section is only intended to enhance understanding of the background of the disclosure, and thus may include information which does not constitute related art known by those of ordinary skill in the art.

SUMMARY

An object of the disclosure is to provide a power supply circuit and a chip, to generate a power supply voltage related to characteristics of a transistor and temperature of the chip.

According to a first aspect of the disclosure, there is provided a power supply circuit, including a constant current generation circuit and a voltage generation circuit. The constant current generation circuit is configured to generate a first current with a positive temperature coefficient and a second current with a negative temperature coefficient, and generate a constant current according to the first current and the second current. The voltage generation circuit includes a transistor, which is coupled to the constant current generation circuit, and configured to generate a temperature-dependent voltage according to the constant current and characteristics of the transistor.

According to a second aspect of the disclosure, there is provided a chip, including the power supply circuit as described in any one of the above paragraphs. It should be understood that the above general descriptions and the following detailed descriptions are exemplary and explanatory only, and are not intended to limit the disclosure.

BRIEF DESCRIPTION OF THE DRAWINGS

Here, the drawings are incorporated into the description and constitute a part of the description, show embodiments complying with the disclosure, and are used to explain principles of the disclosure together with the description. It is apparent that the drawings in the following descriptions are only some embodiments of the disclosure, and those of ordinary skill in the art may also obtain other drawings according to these drawings without paying any creative work.

DETAILED DESCRIPTION

Figure 1:
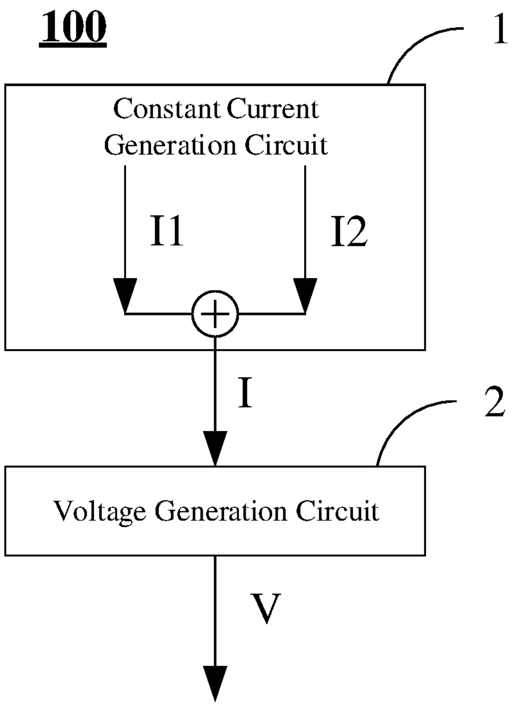
FIG. 1 is a schematic structural diagram of a power supply circuit according to an exemplary embodiment of the disclosure.

Exemplary implementations will now be described more fully with reference to the drawings. However, the exemplary implementations may be implemented in various forms and should not be construed as being limited to examples set forth here. Rather, these implementations are provided so that the disclosure will be more comprehensive and complete, and conceptions of the exemplary implementations will be fully conveyed to those skilled in the art. The described features, structures or characteristics may be combined in one or more implementations in any suitable way. In the following descriptions, many specific details are provided to give a full understanding of the implementations of the disclosure. However, it will be appreciated by those skilled in the art that technical solutions of the disclosure may be practiced without one or more of the specific details, or practiced by other methods, components, devices, steps, or the like. In other cases, well-known technical solutions are not shown or described in detail, to avoid reversing roles of host and guest and obscuring aspects of the disclosure.

Furthermore, the drawings are only schematic illustrations of the disclosure, and the same reference numeral in the drawings denotes the same or similar parts, and thus repeated descriptions thereof will be omitted. Some block diagrams shown in the drawings are functional entities which do not necessarily correspond to physically or logically independent entities. These functional entities may be implemented in form of software, or in one or more hardware modules or integrated circuits (ICs), or in different networks and/or processor devices and/or microcontroller devices.

The exemplary implementations of the disclosure will be described in detail below with reference to the drawings.

FIG. 1 is a schematic structural diagram of a power supply circuit according to an exemplary embodiment of the disclosure.

With reference to FIG. 1, the power supply circuit 100 may include a constant current generation circuit 1 and a voltage generation circuit 2.

The constant current generation circuit 1 is configured to generate a first current I1 with a positive temperature coefficient and a second current I2 with a negative temperature coefficient, and generate a constant current I according to the first current I1 and the second current I2.

The voltage generation circuit 2 includes a transistor, is coupled to the constant current generation circuit 1, and configured to generate a temperature-dependent voltage V according to the constant current I and characteristics of the transistor.

The voltage V generated in the embodiment shown in FIG. 1 is related to the characteristics of the transistor. For example, the characteristics of the transistor may include temperature characteristics and switching speed (process corner) of the transistor.

According to the switching speed, the process corner of transistor may be divided into fast (F), slow (S) and standard (T), here, the standard process corner is determined according to an average value of a driving current of the transistor. A P-type transistor and an N-type transistor in the same region may correspond to the same process corner, or may correspond to different process corners. Transistors with different process corners have different threshold voltages. An absolute value of the threshold voltage of the transistor with the F process corner is lowest, an absolute value of the threshold voltage of the transistor with the T process corner is a median, and an absolute value of the threshold voltage of the transistor with the S process corner is highest. Therefore, the switching speed of the transistor with the F process corner is fastest, the switching speed of the transistor with the T process corner is a median, and the switching speed of the transistor with the S process corner is slowest.

The threshold voltage of the transistor is also related to temperature. The threshold voltage of the N-type transistor decreases with the increase of temperature, and an absolute value of the threshold voltage of the P-type transistor decreases with the increase of temperature. Since the threshold voltage of the P-type transistor is a negative value, the threshold voltage of the P-type transistor decreases with the increase of temperature. Therefore, when the constant current I is input to the transistor in the voltage generation circuit 2, the threshold voltage Vth of the transistor varies with temperature, and the voltage output by the transistor finally is irrelevant to current and is related to temperature only.

Therefore, in the embodiment of the disclosure, the voltage V output by the voltage generation circuit 2 includes an output voltage according to characteristics of the N-type transistor and/or an output voltage according to characteristics of the P-type transistor.

Figure 2:
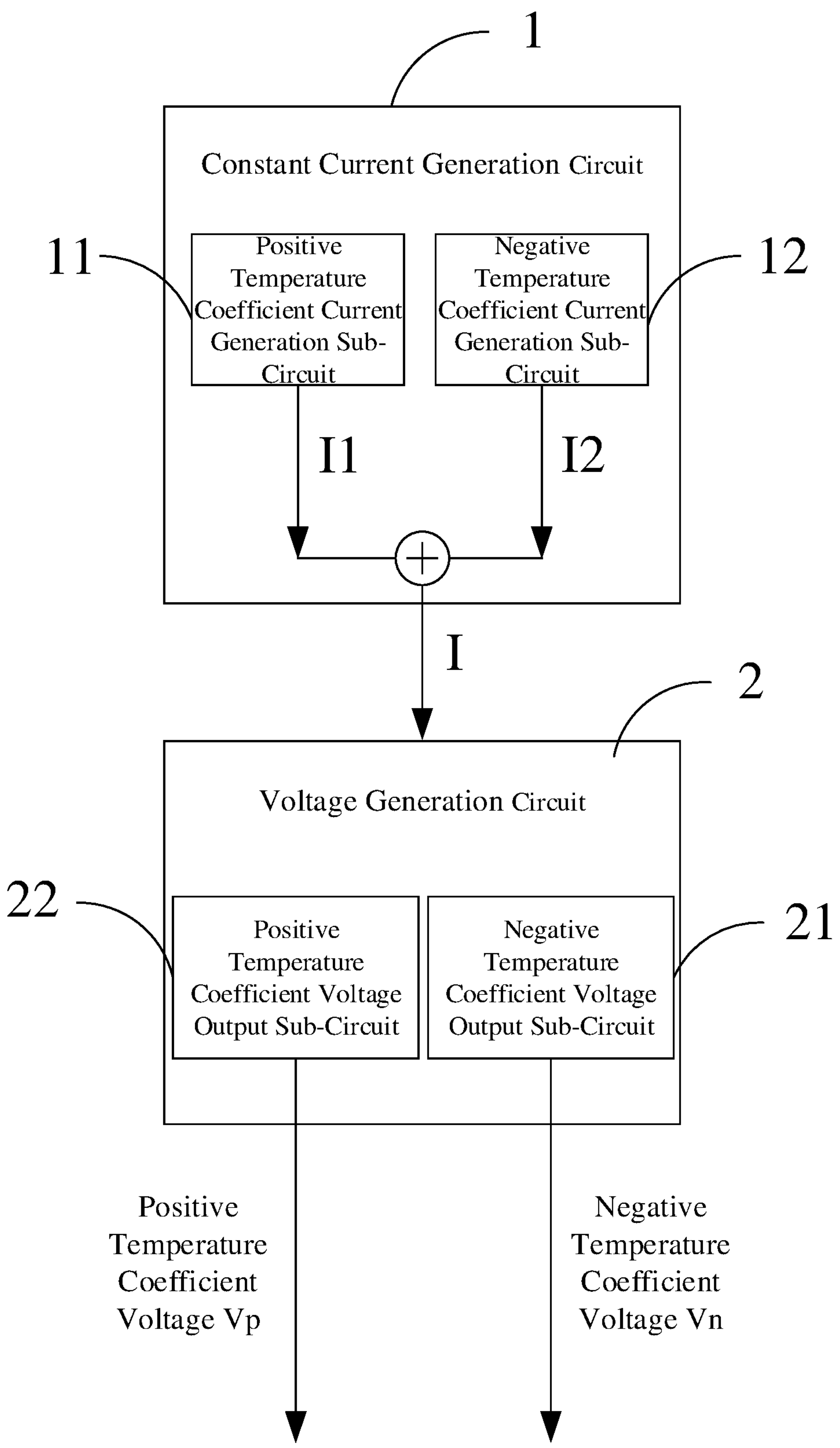
FIG. 2 is a schematic diagram of a voltage generation circuit 2 according to an embodiment of the disclosure.

FIG. 2 is a schematic diagram of a voltage generation circuit 2 according to an embodiment of the disclosure.

With reference to FIG. 2, in an embodiment, the constant current generation circuit 1 may include a positive temperature coefficient current generation sub-circuit 11 and a negative temperature coefficient current generation sub-circuit 12.

The positive temperature coefficient current generation sub-circuit 11 is configured to generate the first current I1.

The negative temperature coefficient current generation sub-circuit 12 is connected to the positive temperature coefficient current generation sub-circuit 11 and configured to generate the second current I2.

The first current I1 and the second current I2 form the constant current I together.

The voltage generation circuit 2 may include a negative temperature coefficient voltage output sub-circuit 21 and a positive temperature coefficient voltage output sub-circuit 22.

The negative temperature coefficient voltage output sub-circuit 21 is connected to the constant current generation circuit 1, includes a monitoring circuit for an N-type transistor, and is configured to output a negative temperature coefficient voltage Vn according to the constant current I and a state of the N-type transistor. The positive temperature coefficient voltage output sub-circuit 22 is connected to the constant current generation circuit 1, includes a monitoring circuit for a P-type transistor, and is configured to output a positive temperature coefficient voltage Vp according to the constant current I and a state of the P-type transistor.

For example, the negative temperature coefficient voltage Vn is a voltage output according to characteristics of the N-type transistor, and for example, the positive temperature coefficient voltage Vp is a voltage output according to characteristics of the P-type transistor, and the two voltages constitute the voltage V generated by the voltage generation circuit 2 together.

Figure 3:
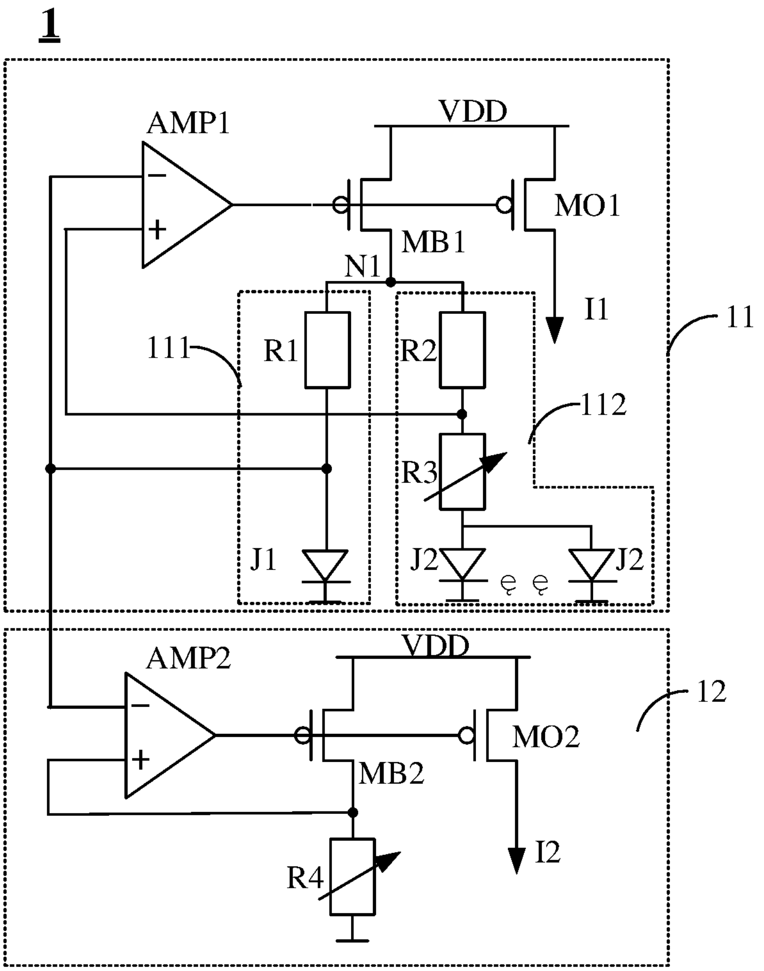
FIG. 3 is a schematic diagram of a constant current generation circuit 1 according to an embodiment of the disclosure.

FIG. 3 is a schematic diagram of a constant current generation circuit 1 according to an embodiment of the disclosure.

With reference to FIG. 3, in an embodiment, the positive temperature coefficient current generation sub-circuit 11 may include a first amplifier AMP1, a first feedback transistor MB1, a first bridge arm 111, a second bridge arm 112, and a first output transistor MO1.

The first feedback transistor MB1 is provided with a source connected to a power supply voltage VDD, a gate connected to an output end of the first amplifier AMP1, and a drain connected to a first node N1.

The first bridge arm 111 includes a first resistor R1 and multiple parallel-connected first PN junction sub-circuits J1, the first resistor R1 and the first PN junction sub-circuits J1 are connected in series, the first resistor R1 is provided with a first end connected to the first node N1, and a second end connected to an inverted input end of the first amplifier AMP1 and a positive electrode of each of the first PN junction sub-circuits J1, and a negative electrode of each of the first PN junction sub-circuits J1 is grounded.

The second bridge arm 112 includes a second resistor R2, a third resistor R3 and second PN junction sub-circuits J2, the second resistor R2, the third resistor R3 and the second PN junction sub-circuits J2 are connected in series, the second resistor R2 is provided with a first end connected to the first node N1 and a second end connected to an in-phase input end of the first amplifier AMP1, the third resistor R3 is provided with a first end connected to the in-phase input end of the first amplifier AMP1 and a second end connected to a positive electrode of each of the second PN junction sub-circuits J2, a negative electrode of each of the second PN junction sub-circuits J2 is grounded.

The first output transistor MO1 is provided with a source connected to the power supply voltage VDD, a gate connected to the output end of the first amplifier AMP1, and a drain configured to output the first current I1.

Each of the first feedback transistor MB1 and the first output transistor MO1 may be a P-type transistor.

The second PN junction sub-circuits J2 may include multiple second PN junction sub-circuits in number. Multiple second PN junction sub-circuits J2 are connected in parallel, the positive electrode of each of the second PN junction sub-circuits is connected to the second end of the third resistor R3, and the negative electrode of each of the second PN junction sub-circuits is grounded. In an embodiment, the number of the second PN junction sub-circuits may be $N=(M+2)^2-M^2$, and the first PN junction sub-circuits includes $M^2$ first PN junction sub-circuits in number, M is an integer greater than or equal to 1. Such arrangement enables the second PN junction sub-circuits J2 to surround the first PN junction sub-circuits J1 during manufacturing, to form a (M+2)*(M+2) PN junction sub-circuit array.

For example, when M=1, N=3, the number of the first PN junction sub-circuits J1 is 1, the number of the second PN junction sub-circuits J2 is 3*3−1=8, and the first PN junction sub-circuits J1 and the second PN junction sub-circuits J2 are arranged in a 3*3 array.

When M=2, N=4, the number of the first PN junction sub-circuits J1 is 4, the number of the second PN junction sub-circuits J2 is 4*4−4=12, and the first PN junction sub-circuits J1 and the second PN junction sub-circuits J2 are arranged in a 4*4 array.

When M=3, N=5, the number of the first PN junction sub-circuits J1 is 9, the number of the second PN junction sub-circuits J2 is 5*5−9=16, and the first PN junction sub-circuits J1 and the second PN junction sub-circuits J2 are arranged in a 5*5 array. The rest may be deduced by analogy.

In the embodiment shown in FIG. 3, in order to simplify analysis, let M=1, N=3, the number of the first PN junction sub-circuits J1 is 1, and the number of the second PN junction sub-circuits J2 is 8.

In the embodiment shown in FIG. 3, the first resistor R1 is the same as the second resistor R2. Due to virtual short characteristics of the amplifier, a voltage difference between the first node N1 and the inverted input end of the first amplifier AMP1 is equal to a voltage difference between the first node N1 and the in-phase input end of the first amplifier AMP1, and the first resistor R1 between a resistance value of the first node N1 and the inverted input end of the first amplifier AMP1 is equal to a resistance value of the second resistor R2 between the first node N1 and the in-phase input end of the first amplifier AMP1, then current on the first bridge arm 111 is the same as current on the second bridge arm 112.

Inference is continued, the voltage difference between the first node N1 and the inverted input end of the first amplifier AMP1 is equal to the voltage difference between the first node N1 and the in-phase input end of the first amplifier AMP1, and the voltage difference between the first node N1 and the inverted input end of the first amplifier AMP1 is equal to a PN junction voltage $V_{BE1}$ of the first PN junction sub-circuit J1, then voltage at the first end of the third resistor R3 is VBE1. Let voltage at the second end of the third resistor R3, that is, at the positive electrode of the second PN junction sub-circuit J2 is $V_{BE2}$. According to a V-I characteristic expression of PN junction, there is:

$$I_D=I_S(e^{V_{BE}In V_T}-1) \tag{1}$$

$I_D$ is a current of the PN junction sub-circuit, $I_S$ is a reverse saturation current of the PN junction sub-circuit (it is related to temperature and is constant when the temperature is determined), $V_T$ is a thermal voltage and $V_T$=kT/q, K is Boltzmann constant, q is charge on an electron, k=1.38×$10^{-23}$ J/K (Joule/Kelvin), q=1.6×$10^{-19}$ C (Coulomb), T is an absolute temperature in Kelvin. $V_T$ is also referred to as a voltage equivalent value of temperature, and refers to a potential difference caused by a temperature difference between two points in a closed circuit. When T=300K (normal atmospheric temperature), $$V_T=\frac{kT}{q}\approx 0.026\text{ V}.$$

n is an emission coefficient, related to size and material of the PN junction and a current passing through it, and is between 1 and 2.

Since the current on the first bridge arm 111 is the same as the current on the second bridge arm 112, currents on eight parallel-connected second PN junction sub-circuits J2 are equal to current on the first PN junction sub-circuit J1. It is assumed that the current on each of the second PN junction sub-circuits J2 is $I_0$, then the current on the first PN junction sub-circuit J1 is $8I_0$.

When the number of the first PN junction sub-circuits J1 and the number of the second PN junction sub-circuits J2 are other values, it is assumed that the current on each of the second PN junction sub-circuits J2 is $I_0$, the current on the first PN junction sub-circuit J1 is Z $I_0$. Z is a number ratio of the second PN junction sub-circuits J2 to the first PN junction sub-circuits J1.

When $V_{BE}$ is much greater than $V_T$, 1 within the parentheses in formula (1) may be ignored. Let n=1, then there is:

$$8I_0=I_S(e^{V_{RE1}/V_T}-1) \tag{2}$$

Therefore:

$$V_{BE1}=V_T\ln\frac{8I_0}{I_s} \tag{3}$$

Similarly, a formula of $V_{BE2}$ is obtained:

$$I_D=I_S(e^{V_{BE2}/V_T}-1) \tag{4}$$

According to the same assumptions and deduction, we obtain:

$$V_{BE2}=V_T\ln\frac{I_0}{I_s} \tag{5}$$

Therefore, a voltage $V_{BE1}-V_{BE2}$ on the third resistor R3 is:

$$V_{BE1}-V_{BE2}=V_T\ln\frac{NI_0}{I_s}-V_T\ln\frac{I_0}{I_s}=V_T\ln 8 \tag{6}$$

Therefore, a current $I_{112}$ on the second bridge arm 112 is:

$$I_{112}=\frac{V_{BE1}-V_{BE2}}{R3}=\frac{V_T\ln 8}{R3} \tag{7}$$

R3 is a resistance value of the third resistor R3. Since when N is determined, $V_{BE1}-V_{BE2}$ is proportional to $V_T$ and $V_T$ is proportional to temperature T, the current $I_{112}$ on the second bridge arm 112 is proportional to temperature T and is a positive temperature coefficient current.

In the above formulas, when the number of the first PN junction sub-circuits J1 and the number of the second PN junction sub-circuits J2 are other values, the number 8 in formulas (2)~(7) may be replaced by the number ratio Z of the second PN junction sub-circuits J2 to the first PN junction sub-circuits J1.

Since the current on the first bridge arm 111 is the same as the current on the second bridge arm 112, a current of the first feedback transistor MB1 is equal to twice the current on the second bridge arm 112, i.e., $2V_T$lnN/R3.

The first feedback transistor MB1 and the first output transistor MO1 constitute a current mirror. In an embodiment, a width-to-length ratio of a channel of each of the first feedback transistor MB1 and the first output transistor MO1 has a value of 2:1. Therefore, the first current I1 output by the drain of the first output transistor MO1 is equal to half of the current on the first feedback transistor MB1, and equal to the current $I_{112}$ on the second bridge arm 112.

It may be seen that the current I1 output by the drain of the first output transistor MO1 is negatively correlated with the resistance value of the third resistor R3. Therefore, the third resistor R3 may be set as an adjustable resistor to adjust value of the first current I1.

In the embodiment shown in FIG. 3, each of the first PN junction sub-circuit J1 and the second PN junction sub-circuit J2 is implemented by a self-biased transistor, the self-biased transistor is an N-type transistor, and both gate and source of the self-biased transistor are grounded. In other embodiments of the disclosure, each of the first PN junction sub-circuit J1 and the second PN junction sub-circuit J2 may be implemented in various ways, and may also be implemented directly by a diode, which is not particularly limited in the disclosure.

With continuous reference to the embodiment shown in FIG. 3, the negative temperature coefficient current generation sub-circuit 12 may include a second amplifier AMP2, a second feedback transistor MB2, a fourth resistor R4, and a second output transistor M02.

The second amplifier AMP2 is provided with an inverted input end connected to the inverted input end of the first amplifier AMP1.

The second feedback transistor MB2 is provided with a source connected to the power supply voltage VDD, a gate connected to an output end of the second amplifier AMP2, and a drain connected to an in-phase input end of the second amplifier AMP2.

The fourth resistor R4 is provided with an end connected to the in-phase input end of the second amplifier AMP2, and another end grounded.

The second output transistor MO2 is provided with a source connected to the power supply voltage VDD, a gate connected to the output end of the second amplifier AMP2, and a drain configured to output the second current I2.

It may be known from analysis that the second output transistor MO2 and the second feedback transistor MB2 constitute a current mirror. Voltage at the in-phase input end of the second amplifier AMP2 is equal to voltage at the inverted input end of the second amplifier AMP2, and voltage on the fourth resistor R4 is equal to the junction voltage $V_{BE1}$ of the first PN junction sub-circuit J1, therefore current on the second feedback transistor MB2 is equal to $V_{BE1}$/R4. It is assumed that a width-to-length ratio of a channel of each of the second feedback transistor MB2 and the second output transistor MO2 has a value of 1:1, the second current I2 output by the drain of the second output transistor MO2 is:

$$I2=V_{BE1}/R4 \tag{8}$$

According to formula (6), we obtain:

$$V_{BE1}=V_{BE2}+V_T ln8 \tag{9}$$

Therefore:

$$I2=\frac{V_{BE1}}{R4}=\frac{V_{BE2}+V_T\ln 8}{R4} \tag{10}$$

Voltage drop produced by the PN junction when current flows through it, is related to forward current and temperature. The greater the current, the greater the voltage drop, and the higher the temperature, the smaller the voltage drop. That is, the PN junction has a negative temperature coefficient voltage. Therefore, $V_{BE2}$ is a negative temperature coefficient voltage, and I2 is a negative temperature coefficient current.

Furthermore, the finally output constant current I=I1+I2, a formula for obtaining the constant current I is:

$$I=I1+I2=\frac{V_T\ln 8}{R3}+\frac{V_T\ln 8+V_{BE2}}{R4} \tag{11}$$

I1 is a positive temperature coefficient current, I2 is a negative temperature coefficient current, and both $V_T$ and $V_{BE2}$ are values related to temperature T. The resistance values of the third resistor R3 and the fourth resistor R4 are adjusted, and the constant current I is a zero temperature coefficient current when a derivative of formula (11) on temperature T is zero.

In an exemplary embodiment of the disclosure, the adjustable resistor is implemented by a resistor string including multiple sub-resistors connected in series and multiple switching elements, multiple sub-resistors connected in series have multiple connection points of which two are connected to both ends of a respective one of the switching elements respectively, and connection points to which different switching elements are connected are not exactly the same.

Figure 4:
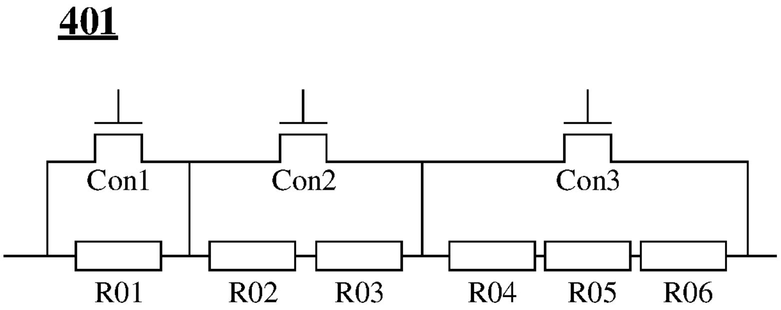
FIG. 4 and FIG. 5 are schematic diagrams of adjustable resistors according to embodiments of the disclosure.
Figure 5:
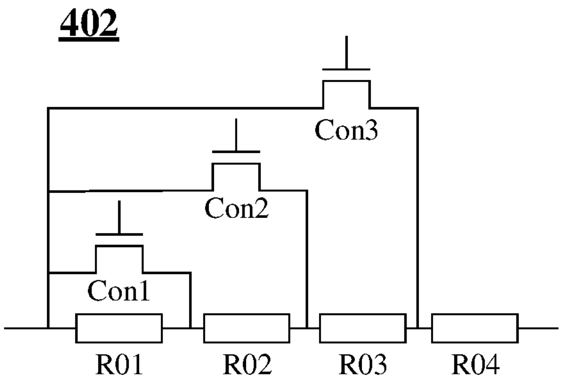

FIG. 4 and FIG. 5 are schematic diagrams of adjustable resistors according to embodiments of the disclosure. Both the third resistor R3 and the fourth resistor R4 may be implemented by solutions shown in FIG. 4 or FIG. 5.

With reference to FIG. 4, a resistor string 401 includes multiple sub-resistors R01, R02, R03, R04, R05, R06 connected in series, and controllable switching elements Con1, Con2, Con3 connected to first or second ends of the sub-resistors. First and second ends of the switching element Con1 are connected to first and second ends of the sub-resistor R01 respectively; first and second ends of the switching element Con2 are connected to the second end of the sub-resistor R01/a first end of the sub-resistor R02 and a second end of the sub-resistor R03/a first end of the sub-resistor R04 respectively; first and second ends of the switching element Con3 are connected to the second end of the sub-resistor R03/the first end of the sub-resistor R04 and a second end of the sub-resistor R06 respectively. A control end of each of the switching elements Con1, Con2, Con3 receives a control signal. For example, the control signal comes from a processor or a one-time programmable controller, which is not particularly limited in the disclosure.

In the embodiment shown in FIG. 4, the switching element is implemented by an N-type transistor, and gate of the N-type transistor is used as the control end. In other embodiments of the disclosure, the switching element may also be implemented by other elements, which is not particularly limited in the disclosure.

It is assumed that a resistance value of each of the sub-resistors R01, R02, R03, R04, R05, R06 is R, a resistance value of the resistor string 401 and turn-on states of the switching elements Con1, Con2, Con3 are shown in Table 1.

TABLE 1

| Con1 | Con2 | Con3 | Resistance value of the resistor string 401 |
|---|---|---|---|
| Turn off | Turn off | Turn off | 6R |
| Turn on | Turn off | Turn off | 5R |

TABLE 1-continued

| Con1 | Con2 | Con3 | Resistance value of the resistor string 401 |
|---|---|---|---|
| Turn on | Turn on | Turn off | 3R |
| Turn on | Turn off | Turn on | 2R |
| Turn off | Turn on | Turn on | R |
| Turn off | Turn on | Turn off | 4R |
| Turn off | Turn off | Turn on | 3R |

The above resistance table is different according to different number of resistors bridged by the switching elements Con1, Con2, Con3. Those skilled in the art may adjust the number and resistance values of the sub-resistors, the number of the switching elements, and connection relationships between the switching elements and the sub-resistors according to the principle shown in FIG. 4, thereby implementing setting of various resistance values.

With reference to FIG. 5, a resistor string 402 includes multiple sub-resistors R01, R02, R03, R04 connected in series. A first end of the sub-resistor R01 is used as a first end of the resistor string 402, first ends of the sub-resistors R02, R03, R04 are connected to second ends of sub-resistors R01, R02, R03 respectively, and the second ends of the sub-resistors R01, R02, R03 are connected to second ends of switching elements Con1, Con2, Con3 respectively.

First and second ends of the switching element Con1 are connected to first and second ends of the sub-resistor R01 respectively; first and second ends of the switching element Con2 are connected to the first end of the resistor string 402 and the second end of the sub-resistor R02 respectively; first and second ends of the switching element Con3 are connected to the first end of the resistor string 402 and the second end of the sub-resistor R03 respectively.

It is assumed that a resistance value of each of the sub-resistors R01, R02, R03, R04 is R, then a resistance value of the resistor string 402 and turn-on states of the switching elements Con1, Con2, Con3 are shown in Table 2.

TABLE 2

| Con1 | Con2 | Con3 | Resistance value of the resistor string 402 |
|---|---|---|---|
| Turn off | Turn off | Turn off | 4R |
| Turn on | Turn off | Turn off | 3R |
| Turn off | Turn on | Turn off | 2R |
| Turn off | Turn off | Turn on | R |

It may be known from Table 2 that in the embodiment shown in FIG. 5, at most one switching element is controlled to be turned on, to adjust the resistance value of the resistor string 402. In the embodiment shown in FIG. 5, only one sub-resistor is spaced between second ends of two switching elements, however, in other embodiments of the disclosure, different number of sub-resistors, or sub-resistors with different resistance values, or different number of sub-resistors with different resistance values may be spaced between second ends of two switching elements. It should be noted that the switching element of which two ends bridge a maximum number of sub-resistors needs to be connected to a sub-resistor at its second end, to prevent the resistance value of the resistor string 402 from becoming 0.

Figure 6:
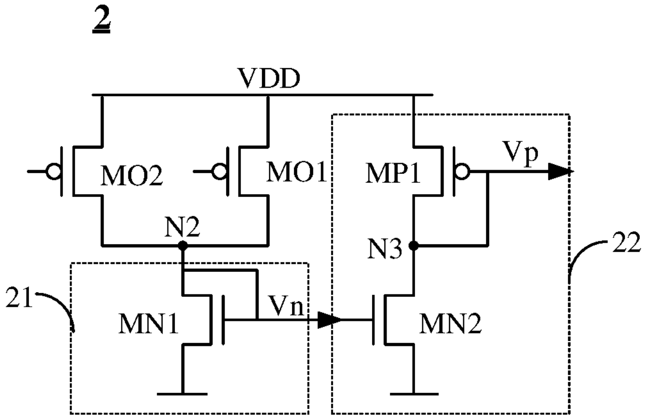
FIG. 6 is a schematic diagram of a voltage generation circuit 2 corresponding to the constant current generation circuit 1 shown in FIG. 3.

FIG. 6 is a schematic diagram of a voltage generation circuit 2 corresponding to the constant current generation circuit 1 shown in FIG. 3.

In the embodiment shown in FIG. 6, when the constant current generation circuit 1 is shown in FIG. 3, the negative temperature coefficient voltage output sub-circuit 21 may include a first N-type transistor MN1.

The first N-type transistor MN1 is provided with a drain and a gate each connected to a second node N2, and a source grounded, the second node N2 is connected to the drain of the first output transistor MO1 and the drain of the second output transistor MO2, and configured to output the negative temperature coefficient voltage Vn.

The positive temperature coefficient voltage output sub-circuit 22 may include a second N-type transistor MN2 and a first P-type transistor MP1.

The second N-type transistor MN2 is provided with a gate connected to the drain of the first output transistor MO1 and the drain of the second output transistor MO2, a source grounded, and a drain connected to a third node N3.

The first P-type transistor MP1 is provided with a source connected to a power supply voltage VDD, a gate and a drain each connected to the third node N3, and the third node N3 is configured to output the positive temperature coefficient voltage Vp.

With the embodiment shown in FIG. 6, the power supply circuit 100 outputs the negative temperature coefficient voltage Vn and the positive temperature coefficient voltage Vp finally, and the negative temperature coefficient voltage Vn and the positive temperature coefficient voltage Vp constitute the voltage V related to temperature and characteristics of the transistor together.

Since the negative temperature coefficient voltage Vn is only affected by the constant current I and characteristics of the first N-type transistor MN1, and the constant current I is irrelevant to temperature, the negative temperature coefficient voltage Vn is only related to the characteristics of the first N-type transistor MN1.

According to the foregoing descriptions, the threshold voltage (Vth) of the first N-type transistor MN1 decreases with the increase of temperature, and current flowing through the first N-type transistor MN1 is the constant current I which is proportional to a difference between a gate-source voltage (Vgs) and the threshold voltage (Vth) of the first N-type transistor MN1. Therefore, when the constant current I is not changed, a source voltage of the first N-type transistor MN1 is not changed and the threshold voltage (Vth) decreases, a gate voltage, i.e., Vn, of the first N-type transistor MN1 decreases. Therefore, Vn is a negative temperature coefficient voltage, that is, the higher the temperature, the smaller the voltage of the negative temperature coefficient voltage Vn. Furthermore, the faster the turn-on speed of the first N-type transistor MN1, the smaller the threshold voltage Vth, that is, the smaller the voltage of the negative temperature coefficient voltage Vn.

In summary, the negative temperature coefficient voltage output sub-circuit 21 shown in FIG. 6 may automatically output a negative temperature coefficient voltage when temperature changes. The negative temperature coefficient voltage Vn may be used as a substrate bias voltage of the N-type transistor, so that an N-substrate bias voltage of the transistor is automatically adjusted when temperature changes, to achieve automatic change of the N-substrate bias voltage of the transistor with the temperature, thereby reducing increase of leakage current of the N-type transistor due to increase of the temperature.

In the positive temperature coefficient voltage output sub-circuit 22 shown in FIG. 6, the second N-type transistor MN2 and the first N-type transistor MN1 constitute a current mirror, and a drain current of the second N-type transistor MN2 is proportional to a drain current of the first N-type transistor MN1. Therefore, a drain current of the first P-type transistor MP1 is also a constant current with zero temperature coefficient. In the embodiment of the disclosure, in order to simplify analysis, a width-to-length ratio of a channel of the second N-type transistor MN2 is set to be the same as a width-to-length ratio of a channel of the first N-type transistor MN1, then the drain current of the first P-type transistor MP1 is equal to the constant current I on the first N-type transistor MN1.

The positive temperature coefficient voltage Vp is only affected by the constant current I and characteristics of the first P-type transistor MP1, and the constant current I is irrelevant to temperature, therefore the positive temperature coefficient voltage Vp is only related to the characteristics of the first P-type transistor MP1.

In contrast to the N-type transistor, the threshold voltage of the P-type transistor increases with the increase of temperature, and current on the first P-type transistor MP1 is the constant current I which is proportional to a difference between a gate-source voltage (Vgs, it is a negative value when the transistor is turned on) and the threshold voltage (Vth, it is a negative value) of the first P-type transistor MP1. Therefore, when the threshold voltage of the first P-type transistor MP1 increases with the increase of temperature, the difference between the gate-source voltage (Vgs) and the threshold voltage (Vth) of the first P-type transistor MP1 is not changed, and the gate-source voltage (Vgs) of the first P-type transistor MP1 increases with the increase of temperature. In case that a source voltage of the first P-type transistor MP1 is not changed, a gate voltage, i.e., Vp, of the first P-type transistor MP1 increases with the increase of temperature, and Vp is a positive temperature coefficient voltage.

Furthermore, the faster the turn-on speed of the first P-type transistor MP1, the smaller the absolute value of the threshold voltage, the higher the threshold voltage. When the current of the first P-type transistor MP1 is the constant current I, the gate-source voltage (Vgs), i.e., the positive temperature coefficient voltage Vp, of the first P-type transistor MP1 increases with the increase of the turn-on speed of the first P-type transistor MP1.

In summary, the positive temperature coefficient voltage output sub-circuit 22 shown in FIG. 6 may automatically output a positive temperature coefficient voltage or determine the output voltage according to the process corner of the transistor, when temperature changes. The positive temperature coefficient voltage Vp may be used as a substrate bias voltage of the P-type transistor, so that the substrate bias voltage of the P-type transistor may be automatically adjusted when temperature of the chip changes, to achieve automatic change of the substrate bias voltage of the P-type transistor with the temperature, thereby reducing increase of leakage current of the P-type transistor due to increase of the temperature.

Both the negative temperature coefficient voltage output sub-circuit 21 and the positive temperature coefficient voltage output sub-circuit 22 are provided in FIG. 6, however, in an actual application, only the negative temperature coefficient voltage output sub-circuit 21 or the positive temperature coefficient voltage output sub-circuit 22 may be provided as required. It should be noted that when only the positive temperature coefficient voltage output sub-circuit 22 is provided, the first N-type transistor MN1 also needs to be provided to construct a current mirror.

According to a second aspect of the disclosure, there is provided a chip, including the power supply circuit as described in any one of the foregoing embodiments.

An object of the disclosure is to provide a power supply circuit and a chip, to generate a power supply voltage related to characteristics of a transistor and temperature of the chip, thereby simplifying configuration of a control circuit in the circuit and reducing chip volume.

According to the embodiments of the disclosure, the constant current is generated by using the first current with a positive temperature coefficient and the second current with a negative temperature coefficient, and then the voltage related to temperature and characteristics of the transistor is generated according to the constant current and the transistor, so that arrangement of a detection circuit in the chip is reduced, the detection circuit and the power supply circuit are directly combined into one circuit, improving control efficiency and reducing chip volume.

It should be noted that although several circuits or sub-circuits of a device for performing actions are mentioned in the above detailed descriptions, this division is not mandatory. Indeed, according to implementations of the disclosure, features and functions of two or more circuits or sub-circuits as described above may be concretized in one circuit or sub-circuit. On the contrary, features and functions of one circuit or sub-circuit as described above may be further divided into multiple circuits or sub-circuits to be concretized. Other implementations of the disclosure will be easily conceived by those skilled in the art after considering the specification and practicing inventions disclosed here. The disclosure is intended to cover any variants, usages or adaptive variations of the disclosure, and these variants, usages or adaptive variations follow general principles of the disclosure, and include common knowledge or conventional technical means in the technical field which are not disclosed in the disclosure. The specification and embodiments are considered as exemplary only, and the true scope and concept of the disclosure is indicated by the claims.

INDUSTRIAL APPLICABILITY

According to the embodiments of the disclosure, the constant current is generated by using the first current with a positive temperature coefficient and the second current with a negative temperature coefficient, and then the voltage related to temperature and characteristics of the transistor is generated according to the constant current and the transistor, so that arrangement of a detection circuit in the chip may be reduced, the detection circuit and the power supply circuit are directly combined into one circuit, improving control efficiency and reducing chip volume.

The invention claimed is:

1. A power supply circuit, comprising:

a constant current generation circuit, configured to generate a first current with a positive temperature coefficient and a second current with a negative temperature coefficient, and generate a constant current according to the first current and the second current; and a voltage generation circuit, comprising a transistor, coupled to the constant current generation circuit, and configured to generate a temperature-dependent voltage according to the constant current and characteristics of the transistor;

wherein the constant current generation circuit comprises:

a positive temperature coefficient current generation sub-circuit, configured to generate the first current; wherein the positive temperature coefficient current generation sub-circuit comprises:

a first amplifier;

a first feedback transistor, provided with a source connected to a power supply voltage, a gate connected to an output end of the first amplifier, and a drain connected to a first node;

a first bridge arm, comprising a first resistor and a plurality of parallel-connected first PN junction sub-circuits, the first resistor and the first PN junction sub-circuits connected in series, the first resistor provided with a first end connected to the first node and a second end connected to an inverted input end of the first amplifier, each of the first PN junction sub-circuits provided with a positive electrode connected to the inverted input end of the first amplifier and a negative electrode grounded;

a second bridge arm, comprising a second resistor, a third resistor and a plurality of parallel-connected second PN junction sub-circuits, the second resistor, the third resistor and the second PN junction sub-circuits connected in series, the second resistor provided with a first end connected to the first node and a second end connected to an in-phase input end of the first amplifier, the third resistor provided with a first end connected to the in-phase input end of the first amplifier and a second end connected to a positive electrode of each of the second PN junction sub-circuits, a negative electrode of each of the second PN junction sub-circuits grounded; and a first output transistor, provided with a source connected to the power supply voltage, a gate connected to the output end of the first amplifier, and a drain configured to output the first current.

2. The power supply circuit of claim 1, wherein the voltage generation circuit comprises at least one of a positive temperature coefficient voltage output sub-circuit or a negative temperature coefficient voltage output sub-circuit, the positive temperature coefficient voltage output sub-circuit is connected to the constant current generation circuit, comprises a monitoring circuit for a P-type transistor, and is configured to output a positive temperature coefficient voltage according to the constant current and a state of the P-type transistor; the negative temperature coefficient voltage output sub-circuit is connected to the constant current generation circuit, comprises a monitoring circuit for an N-type transistor, and is configured to output a negative temperature coefficient voltage according to the constant current and a state of the N-type transistor.

3. The power supply circuit of claim 1, wherein the constant current generation circuit comprises:

a negative temperature coefficient current generation sub-circuit, connected to the positive temperature coefficient current generation sub-circuit and configured to generate the second current.

4. The power supply circuit of claim 3, wherein a resistance value of the first resistor is equal to a resistance value of the second resistor.

5. The power supply circuit of claim 3, wherein the first feedback transistor and the first output transistor constitute a current mirror, and a width-to-length ratio of a channel of each of the first feedback transistor and the first output transistor has a value of 2:1.

6. The power supply circuit of claim 3, wherein the second PN junction sub-circuits comprise N second PN junction sub-circuits in number, N=(M+2)2−M2, and the first PN junction sub-circuits comprise M2 first PN junction sub-circuits in number, M is an integer greater than or equal to 1.

7. The power supply circuit of claim 3, wherein each of the first PN junction sub-circuits and the second PN junction sub-circuits is implemented by a self-biased transistor, the self-biased transistor is an N-type transistor, and both gate and source of the self-biased transistor are grounded.

8. The power supply circuit of claim 3, wherein the third resistor is an adjustable resistor.

9. The power supply circuit of claim 3, wherein the negative temperature coefficient current generation sub-circuit comprises:

a second amplifier, provided with an inverted input end connected to the inverted input end of the first amplifier;

a second feedback transistor, provided with a source connected to the power supply voltage, a gate connected to an output end of the second amplifier, and a drain connected to an in-phase input end of the second amplifier;

a fourth resistor, provided with an end connected to the in-phase input end of the second amplifier, and another end grounded; and a second output transistor, provided with a source connected to the power supply voltage, a gate connected to the output end of the second amplifier, and a drain configured to output the second current.

10. The power supply circuit of claim 9, wherein the fourth resistor is an adjustable resistor.

11. The power supply circuit of claim 9, wherein resistance values of the third resistor and the fourth resistor satisfy that a derivative of (KT/q)*InZ/R3+ (kTq*InZ+VBE2)/R4 on temperature T is zero, where R3 is the resistance value of the third resistor, R4 is the resistance value of the fourth resistor, K is Boltzmann constant, q is charge on an electron, T is operation temperature of the power supply circuit, VBE2 is a voltage difference across the second PN junction sub-circuit, and Z is a number ratio of the second PN junction sub-circuits to the first PN junction sub-circuits.

12. The power supply circuit of claim 8, wherein the adjustable resistor is implemented by a resistor string comprising a plurality of sub-resistors connected in series and a plurality of switching elements, the plurality of sub-resistors connected in series have a plurality of connection points of which two are connected to both ends of a respective one of the switching elements respectively, and connection points to which different switching elements are connected are not exactly the same.

13. The power supply circuit of claim 2, wherein the negative temperature coefficient voltage output sub-circuit comprises:

a first N-type transistor, provided with a drain and a gate each connected to a second node, and a source grounded, the second node connected to a drain of a first output transistor and a drain of a second output transistor, and configured to output the negative temperature coefficient voltage.

14. The power supply circuit of claim 2, wherein the positive temperature coefficient voltage output sub-circuit comprises:

a second N-type transistor, provided with a gate connected to a drain of a first output transistor and a drain of a second output transistor, a source grounded, and a drain connected to a third node; and a first P-type transistor, provided with a source connected to a power supply voltage, a gate and a drain each connected to the third node, and the third node configured to output the positive temperature coefficient voltage.

15. A chip, comprising a power supply circuit, wherein the power supply circuit comprises:

a constant current generation circuit, configured to generate a first current with a positive temperature coefficient and a second current with a negative temperature coefficient, and generate a constant current according to the first current and the second current; and a voltage generation circuit, comprising a transistor, coupled to the constant current generation circuit, and configured to generate a temperature-dependent voltage according to the constant current and characteristics of the transistor;

wherein the constant current generation circuit comprises:

a positive temperature coefficient current generation sub-circuit, configured to generate the first current; wherein the positive temperature coefficient current generation sub-circuit comprises:

a first amplifier;

a first feedback transistor, provided with a source connected to a power supply voltage, a gate connected to an output end of the first amplifier, and a drain connected to a first node;

a first bridge arm, comprising a first resistor and a plurality of parallel-connected first PN junction sub-circuits, the first resistor and the first PN junction sub-circuits connected in series, the first resistor provided with a first end connected to the first node and a second end connected to an inverted input end of the first amplifier, each of the first PN junction sub-circuits provided with a positive electrode connected to the inverted input end of the first amplifier and a negative electrode grounded;

a second bridge arm, comprising a second resistor, a third resistor and a plurality of parallel-connected second PN junction sub-circuits, the second resistor, the third resistor and the second PN junction sub-circuits connected in series, the second resistor provided with a first end connected to the first node and a second end connected to an in-phase input end of the first amplifier, the third resistor provided with a first end connected to the in-phase input end of the first amplifier and a second end connected to a positive electrode of each of the second PN junction sub-circuits, a negative electrode of each of the second PN junction sub-circuits grounded; and a first output transistor, provided with a source connected to the power supply voltage, a gate connected to the output end of the first amplifier, and a drain configured to output the first current.

16. The chip of claim 15, wherein the voltage generation circuit comprises at least one of a positive temperature coefficient voltage output sub-circuit or a negative temperature coefficient voltage output sub-circuit, the positive temperature coefficient voltage output sub-circuit is connected to the constant current generation circuit, comprises a monitoring circuit for a P-type transistor, and is configured to output a positive temperature coefficient voltage according to the constant current and a state of the P-type transistor; the negative temperature coefficient voltage output sub-circuit is connected to the constant current generation circuit, comprises a monitoring circuit for an N-type transistor, and is configured to output a negative temperature coefficient voltage according to the constant current and a state of the N-type transistor.

17. The chip of claim 15, wherein the constant current generation circuit comprises:

a negative temperature coefficient current generation sub-circuit, connected to the positive temperature coefficient current generation sub-circuit and configured to generate the second current.

18. The chip of claim 17, wherein a resistance value of the first resistor is equal to a resistance value of the second resistor.

* * * * *